H. J. WATTLES.
Wheel Plow.
No. 68,673.  Patented Sept. 10, 1867.
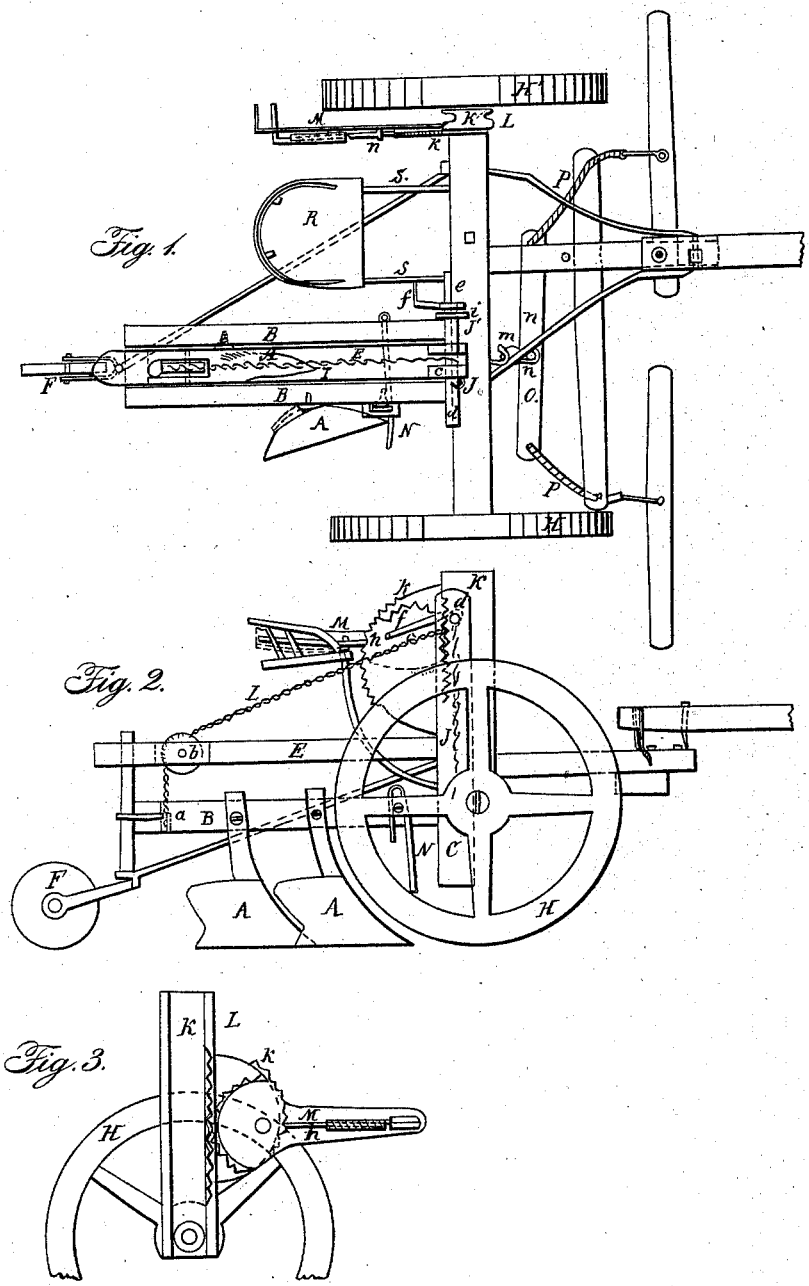
Witnesses:
Inventor:

UNITED STATES PATENT OFFICE.

H. J. WATTLES, OF ROCKFORD, ILLINOIS.

IMPROVEMENT IN GANG-PLOWS.

Specification forming part of Letters Patent No. 68,673, dated September 10, 1867.

*To all whom it may concern:*

Be it known that I, H. J. WATTLES, of Rockford, in the county of Winnebago and State of Illinois, have invented a new and useful Gang-Plow; and I do hereby declare that the following is a full, clear, and exact description of the same, reference being had to the annexed drawings, forming part of this specification, and to the letters of reference marked thereon.

Figure 1 shows a plan view of the machine. Fig. 2 shows a side elevation. Fig. 3 shows the raising and lowering devices of wheel H'.

My invention has reference to an improved device for plowing ground; and it consists of certain combinations of devices hereinafter to be set forth.

In the drawings, the plows A A are secured to the frame B B, the front end of which moves up and down on the stationary guide C, which is secured perpendicularly to the axle D. The piece E is secured to the axle D at right angles to the guide-piece c, extending backward over the plows A A, its rear end supported by the caster-wheel F, which, with the wheels H H' on the axle D, supports the entire plowing device. The plow-frames B B are supported by the chain I, secured to the pin a at their rear end, which, passing over the friction-sheave b in the piece E, is secured to the crank-shaft d, Fig. 2. The chains J J', secured to the front end of the frames B B, are also secured to the crank-shaft d, (supported by the guide-piece C,) by the rotation of which the plows are raised and lowered always parallel to the surface of the ground, being held in any desired position by the spring-pawl e, taking hold upon the ratchet-wheel i on said crank-shaft, Fig. 1. The wheel H' is secured to the sliding piece K, moving in the perpendicular groove L, secured to the axle D. The ratchet upon the slide K is acted upon by the segment-lever M, thereby raising and lowering the wheel H', for the purpose of keeping the axle D, and also the plows A A, level, whatever depth of furrow the wheel H may be in, and are held in such position by the spring-stop h, acting upon the segment k, Fig. 3. The adjustable curved rod N, secured on the frame B in front of the plow, will turn the stubble, weeds, and other trash lengthwise in the furrow, thereby insuring their being completely covered by the plow, a very important consideration. The doubletree or evener O is secured by clevis and ring to the hook m, directly to the plowing mechanism, and is adjusted by means of the holes n n in said evener for three or four horses, as may be desired. To this evener are secured the chains P P, the left-hand chain being required, usually, to be the longest, to enable all the horses except one to walk upon the unplowed ground. To these chains are hitched the horses for drawing the plowing mechanism. This manner of attaching the draft to the plows takes off all "side draft" and allows the use of a hinged tongue, or of working the plows without any tongue, as may be desired. The driver's seat R is supported on the springs S S, and is so located that the driver on the seat can adjust the height of the wheel H', as also the depth of the plowing, for the latter purpose using the foot to throw out the pawl e, while with one hand the crank f is turned, as before described.

What I desire to claim as my invention, and secure by Letters Patent, is—

1. The combination and arrangement of the plowing-frame B B, wheels H H', caster-wheel F, frame-support E, chains I J J', with crank f, operating substantially as described, and for the purpose set forth.

2. The combination and arrangement of the wheel H' with the sliding support K, groove-piece L, segment-lever M, spring-stop h, with stationary segment k, when constructed and operating as described.

3. In combination with the chain-supports I J J', the arrangement of the spring-pawl e, crank f, and ratchet-wheel i, operating substantially as described.

4. The combination of the stubble-turner N with a plowing mechanism, as described.

5. Attaching the team to the plowing mechanism by the evener O, and the chains P P, being of unequal length, the whole arranged to draw directly upon the plows in such manner as to avoid all side draft, substantially as described.

H. J. WATTLES.

Witnesses:
W. W. BURSON,
E. S. BROWN.